United States Patent

Factor et al.

Patent Number: 6,094,706
Date of Patent: Jul. 25, 2000

[54] CACHING IN A DATA PROCESSING SYSTEM USING THE PIGEON HOLE PRINCIPLE

[75] Inventors: Michael Edward Factor, Haifa; Eitan Daniel Farchi, Pardes Hanna, both of Israel

[73] Assignee: International Business Machines Corporation, Armonk, N.Y.

[21] Appl. No.: 09/033,326

[22] Filed: Mar. 2, 1998

[51] Int. Cl.[7] ........................ G06F 12/00
[52] U.S. Cl. .............. 711/113; 711/203; 711/118; 707/6
[58] Field of Search ................. 711/113, 118, 711/158, 703, 202, 112; 707/6, 200

[56] References Cited

U.S. PATENT DOCUMENTS

| 5,008,820 | 4/1991 | Chistopher, Jr. et al. |
| 5,390,318 | 2/1995 | Ramakrishnan et al. ......... 711/158 |
| 5,682,499 | 10/1997 | Bakke et al. ............... 711/112 |
| 5,684,976 | 11/1997 | Soheili-Arasi et al. |

OTHER PUBLICATIONS

R.A. Floyd et al., "Directory Reference Patterns In Hierarchical File Systems", IEEE Transactions on Knowledge and Data Engineering, vol. 1, pp. 238–247, Jun. 1989.

*Primary Examiner*—Behzad James Peikari
*Assistant Examiner*—Pierre-Michel Bataille
*Attorney, Agent, or Firm*—Lawrence D. Maxwell

[57] ABSTRACT

Methods and apparatus for resolving access patterns in a data processing system using the pigeon hole principle are disclosed herein. The data processing system has a directed graph G of access patterns including a vertices set V representing cache items. Each cache item v has an access pattern defined by a path of vertices $(v_1 \rightarrow, \ldots, \rightarrow v_n)$, $v_1$ representing the start of the path and $v_n$ representing the end of the path at cache item v. The method includes defining a prefix cache for directed graph G which contains a map between an access pattern $(v_1 \rightarrow, \ldots, \rightarrow v_k)$ and vertex $v_k$ for a kth level L in graph G, storing the prefix cache in a memory and, for a given access pattern $(v_1 \rightarrow, \ldots, \rightarrow v_n)$, searching the prefix cache for a prefix $(v_1 \rightarrow, \ldots, \rightarrow v_k)$ of the given access pattern that reaches the kth level L. If the search is successful, the method includes outputting vertex $v_k$ by reference to the stored prefix cache and calling an access pattern resolution primitive which accepts access pattern $(v_{k+1} \rightarrow, \ldots, \rightarrow v_n)$ as an input and generates vertex $v_n$ as an output. If the search is unsuccessful, the method includes setting the input to the resolution primitive to the given access pattern $(v_1 \rightarrow, \ldots, \rightarrow v_n)$ to generate vertex $v_n$ as the output. In either case, the given access pattern $(v_1 \rightarrow, \ldots, \rightarrow v_n)$ is fully resolved. Apparatus for performing this method is also disclosed. A particular use of the pigeon hole principle for caching in a data processing system involves the resolution of hierarchical file pathnames into in-core representations of the files named by the paths (i.e., namespace resolution) using prefix caching.

20 Claims, 4 Drawing Sheets

CACHING IN A DATA PROCESSING SYSTEM USING THE PIGEON HOLE PRINCIPLE

FIELD OF THE INVENTION

The invention generally relates to the field of data processing systems, and specifically relates to methods and apparatus for caching in a data processing system using the pigeon hole principle. In a particular use of the pigeon hole principle for caching in a data processing system, the invention relates to resolving hierarchical file pathnames into representations of the files named by the paths (i.e., namespace resolution) using prefix caching.

BACKGROUND OF THE INVENTION

Operating systems for data processing computers typically provide an interface between the application programs running on the computers and files which are physically stored on disks (e.g., optical or magnetic) using a hierarchical or "tree" file structure. The hierarchical file structure of the disks includes a root directory, sub-directories located at any of several levels from the root directory, and multiple files typically stored in the sub-directories. Each file on the disk may be accessed using either its absolute pathname to specify a path from the root directory to the file, or using its relative pathname to specify a path from the current working directory (CWD) to the file. Each directory or file which is specified in the pathname forms a component of the pathname for the given file.

Referring to FIG. 1, an exemplary hierarchical file structure includes a root directory 10 and sub-directories 12 and 14 located at a first level from root directory 10. Sub-directories 16 and 18 are located in sub-directory 12 at a second level from root directory 10. Sub-directories 20 and 22 and file 24 are located in sub-directory 16 at a third level from root directory 10. Files 26 and 28 are stored in sub-directory 20, and files 30 and 32 are stored in sub-directory 22, at a fourth level from root directory 10. Sub-directory 34 and file 36 are located in sub-directory 18 at the third level, and file 38 is stored in sub-directory 34 at the fourth level. Similarly, sub-directories 40 and 42 are located in sub-directory 14 at the second level. Files 44, 46 and 48 are stored in sub-directory 40 at the third level. Sub-directory 50 and file 52 are stored in sub-directory 42 at the third level, and files 54 and 56 are stored in sub-directory 50 at the fourth level. Thus, a given file is stored at the end of a path which starts at root directory 10 and passes through possibly several sub-directories. A given file can be accessed using either its absolute or its relative pathname plus an appended filename, referred to hereinafter as a "pathname/filename." For example, assuming that the CWD is DIR3, the absolute pathname/filename of file 32 (i.e., FILE10) can be specified as /DIR1/DIR3/DIR8/FILE10, and its relative pathname/filename can be specified as DIR8/FILE10. The manner in which file 32 (i.e., FILE10) is accessed will be used throughout this document for illustrative purposes. The same techniques could be used to access any other file in the structure. As will be readily apparent to a person of skill in the art, other exemplary file structures may have more or fewer levels, and more or fewer sub-directories and files located at any directory or sub-directory at any level from the root.

The operating system interface to the directories and files that are physically stored on a disk typically includes a set of interface functions or procedures which are designed to access the files in a standard manner. For example, the OS/400 operating system, available from International Business Machines, Inc. (IBM) of New York, includes a set of application programming interface (API) functions such as open(), close(), read(), write() and stat(). These API functions are operating system services that can be called or invoked by application programs to access files or directories stored on disk or another memory media installed in the computer, thereby avoiding the need for application programs to interface directly with the physical media. Thus, the API function set provides system services which allow application programs to be easily interfaced with files stored on any physical media, including magnetic disks, optical disks (e.g., CD-ROMs), etc.

Each call or invocation of a file interface function or procedure that takes a pathname/filename as a parameter (e.g., the opening of a file such as file 32 in FIG. 1) typically requires the operating system to access the drive for the disk and to search through all of the components (i.e., directories and sub-directories) specified in the file's pathname. The number of searches will depend upon the number of components in the pathname. For example, when file 32 is specified by its absolute pathname, beginning at root directory 10, the operating system will search for sub-directory 12 in root directory 10, then search for sub-directory 16 in sub-directory 12, then search for sub-directory 22 in sub-directory 16, and finally search for file 32 in sub-directory 22. Thus, four searches are required since file 32 is located at the fourth level from root directory 10. Similarly, when the CWD is DIR3 and file 32 is specified by its relative pathname/filename, the operating system will first find sub-directory 16, then search for sub-directory 22 in sub-directory 16, and finally search for file 32 in sub-directory 22. Thus, two directory searches will be needed since file 32 is two levels from the CWD. Each search generally requires a separate access of the physical disk which stores a representation of the directory.

"Namespace resolution" refers to the process of converting or translating a hierarchical pathname/filename into a representation of the file named by the path. In the context of the OS/400 operating system, namespace resolution refers to translation of the pathname for a given file or directory into the in-core or "vnode" representation of the given file or directory. For absolute pathname/filenames (i.e., those starting with a "/"), translation starts at the root directory of the namespace. For relative pathname/filenames (i.e., those not starting with a "/"), translation starts at the CWD. To illustrate namespace resolution by the OS/400 operating system, assume that the pathname/filename to be translated is "/DIR1/DIR3/DIR8/FILE10". Namespace resolution of this pathname begins by searching the root directory ("/") for the first component of the pathname (i.e., "/DIR1"). The logical file system ("LFS") of the OS/400 operating system searches for a component in a directory by calling the "vn_lookup" operation of the vnode representing the directory using the name of the component as an input to the operation. When invoked, the operation generally must access the on-disk representation of the directory to search for the named component. If the search is successful, the operation returns the vnode representation of the component (e.g., the vnode representation of "/DIR1"). Then, the LFS searches for the next pathname component (i.e., "/DIR3") using the "vn_lookup" operation of the vnode representing the previous component ("/DIR1) that was just found. If the search is again successful, the operation returns the vnode representation of this next pathname component (i.e., the vnode representation of "/DIR1/DIR3"). This main loop is repeated until the entire pathname is resolved (i.e., until the vnode representing the pathname "ROOT/DIR1/DIR3/DIR8/FILE10" is obtained). A similar process is used to resolve relative pathnames, except that is starts at the CWD. This process is similar to the traditional namespace resolution process used by the UNIX operating system, referred to as "namei" in the UNIX environment.

The cost (i.e., execution time) of performing the namespace resolution for the pathname operated on by a file interface function or procedure (e.g., an API function in the OS/400 operating system) can be modeled by the number of directory searches that occur during the namespace resolution. Thus, the cost of resolving the namespace resolution of the pathname "ROOT/DIR1/DIR3/DIR8/FILE10" in the above example may be modeled by the four searches required. The directory searches are the most expensive operation the resolution process performs repetitively for several reasons. First, the time required for the search can be adversely effected where there are many files or subdirectories in the directory being searched. The number of components in each directory being searched, however, depends upon the particular application. Second, the search for each component often requires the operating system to access the disk where the previous component is physically stored, and then search for the component on the disk. Disk accesses are relatively slow since the physical block or blocks on the disk where the component resides must be computed, and a sensing or read head must be moved there. The physical movement of the head to the position of the component takes a relatively long time in comparison to the typical operating speed of the computer. Thus, it is desirable to minimize the degree to which head movement of the disk drive is required to fully resolve a pathname by minimizing the number of searches required during the namespace resolution.

Caching can be used to minimize the number of searches required on the disk, thus minimizing the cost of namespace resolution. A cache is a relatively small amount of memory space allocated for storage of copies of frequently used data. When an instruction or data item stored on a disk has been cached, and the instruction or data item is accessed, a cache "hit" occurs, and the instruction or data item is read from the cache instead of from the slower disk, thereby increasing system speed. However, when the item being accessed is not available in the cache (i.e., a cache miss), the slower memory medium must still be accessed. In the ideal case, system speed could be increased by caching all of the instructions or data items which can be accessed. For example, by caching the entire on-disk representation of a file structure directory, namespace resolutions could be performed quickly since no disk accesses would be required. However, practical constraints, such as the relatively high cost of cache memory, limit the number of items which can be cached. For example, practical constraints may allow only a subset of the available pathname/filenames in a namespace to be cached (e.g., the pathname/filename "/DIR1/DIR3/DIR8/FILE9" may be cached, while the pathname/filename "/DIR1/DIR3/DIR8/FILE10" is not cached). Then, a cache hit would allow the entire pathname/filename to be fully resolved without the need to perform any searches of the disk (e.g., "/DIR1/DIR3/DIR8/FILE9" could be fully resolved without accessing the disk). However, the cost of namespace resolution would not be improved at all by a cache miss (e.g., "ROOT/DIR1/DIR3/DIR8/FILE10" would not be resolved by reference to the cache, and all four searches would still be required as if there was no cache). Traditional caching techniques attempt to maximize performance by caching the most frequently used items (e.g., for namespace resolution, traditional caching techniques would try to cache the most frequently used directories).

To reduce the effect on system performance of the limit on the size of cache memory, traditional caching techniques use statistical heuristics to replace cached items used relatively infrequently with new items expected to be used more frequently. Typically, the statistical heuristic technique monitors the usage of the cache items to create a usage profile, and then replaces the least recently used cache items. For example, if a namespace in a file system could be divided a priori into n sub-trees, with each sub-tree having a given expected usage, the performance of the data processing system could be improved by using statistical heuristics to update a cache used for namespace resolution. However, statistical heuristics does not provide good results in situations where the expected usage of the cache items is difficult to predict. For example, usage of the namespace in a file system usually varies dramatically depending on the particular application of the data processing system. Thus, traditional caching techniques cannot be applied, or may yield only relatively minor improvements, when used for resolving pathnames in file systems. Therefore, it would be desirable to provide a caching method or apparatus which can be efficiently applied to namespace resolution in a hierarchical file system. It would also be desirable to provide a caching method or apparatus which is independent of statistical assumptions such as expected usage. It would also be desirable to provide a caching method or apparatus providing some level of improved performance for every memory access despite having a limited cache size.

BRIEF SUMMARY OF THE INVENTION

It is an advantage of the present invention to provide an improved method for resolving access patterns in a data processing system using the pigeon-hole principle. It is also an advantage to provide such a method for resolving access patterns which uses prefix caching. It is a further advantage to provide a caching method and apparatus which operate independently of statistical assumptions about the data processing system, and that provides performance improvements even in data processing systems which are not predictable. It is also an advantage to provide a caching method which provides some level of performance improvement for almost every namespace resolution by caching prefixes of the namespace. Another advantage of the present invention is to provide an improved method and apparatus for namespace resolution in hierarchical file systems which use object-based abstraction during pathname resolution.

One embodiment of the present invention relates to a method for resolving access patterns in a data processing system having a directed graph G of access patterns. Graph G includes a vertices set V representing cache items, each cache item v having at least one access pattern defined by a path of vertices $(v_1 \rightarrow, \ldots, \rightarrow v_n)$, wherein vertex $v_1$ is a start vertex representing the start of the path and vertex $v_n$ is an end vertex representing the end of the path at cache item v. The method includes defining a prefix cache for directed graph G which contains a map between an access pattern $(v_1 \rightarrow, \ldots, \rightarrow v_k)$ and vertex $v_k$ for a kth level L in graph G, wherein vertex $v_k$ is a vertex in the kth level L in graph G which is reached by the access pattern $(v_1 \rightarrow, \ldots, \rightarrow v_k)$ and L is an independent set of vertices in G which does not include any start vertices, and storing the prefix cache in a memory. For a given access pattern $(v_1 \rightarrow, \ldots, \rightarrow v_n)$, the method includes searching the stored prefix cache for a prefix $(v_1 \rightarrow, \ldots, \rightarrow v_k)$ of the given access pattern that reaches the kth level L and, if the search is successful, outputting vertex $v_k$ by reference to the prefix cache, and calling an access pattern resolution primitive which accepts access pattern $(v_k \rightarrow, \ldots, \rightarrow v_n)$ as an input and generates vertex $v_n$ as an output to fully resolve the given access pattern.

Another embodiment of the present invention relates to a method for namespace resolution of a given file in a data processing system having a hierarchical file structure. The file structure has a namespace including a pathname associated with each of a plurality of files, and the pathname for each file includes at least one prefix component and at least one lower-level component. The method includes defining a prefix cache which includes a representation of an upper-level portion of the namespace including the at least one prefix component of the pathname for each of the files, and storing the prefix cache in a memory. The method also includes translating the at least one prefix pathname component for the given file into the representation of the upper-level portion for the given file by searching the prefix cache for the at least one prefix pathname component and, when the translation succeeds, completing resolution of the pathname for the given file by using the at least one lower-level pathname component for the given file as an input to an access pattern resolution primitive which outputs a representation of the given file named by the pathname.

In a computer using a hierarchical file structure having a namespace including a pathname associated with each of a plurality of files, the pathname for each file including at least one prefix component and at least one lower-level component, another embodiment of the present invention relates to an apparatus for resolving hierarchical file pathnames into representations of the files named by the paths. The apparatus includes a memory storing a prefix cache which includes a representation of an upper-level portion of the namespace for the file structure, the upper-level portion of the namespace including the at least one prefix component of the pathname for each of the files. The method also includes means for translating the at least one prefix pathname component for the given file into the representation of the upper-level portion of the namespace for the given file by searching the prefix cache for the at least one prefix pathname component, and means for completing resolution of the pathname for the given file when the translation succeeds by using the at least one lower-level pathname component for the given file as an input to an access pattern resolution primitive which outputs a representation of the given file.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

Figure 1:
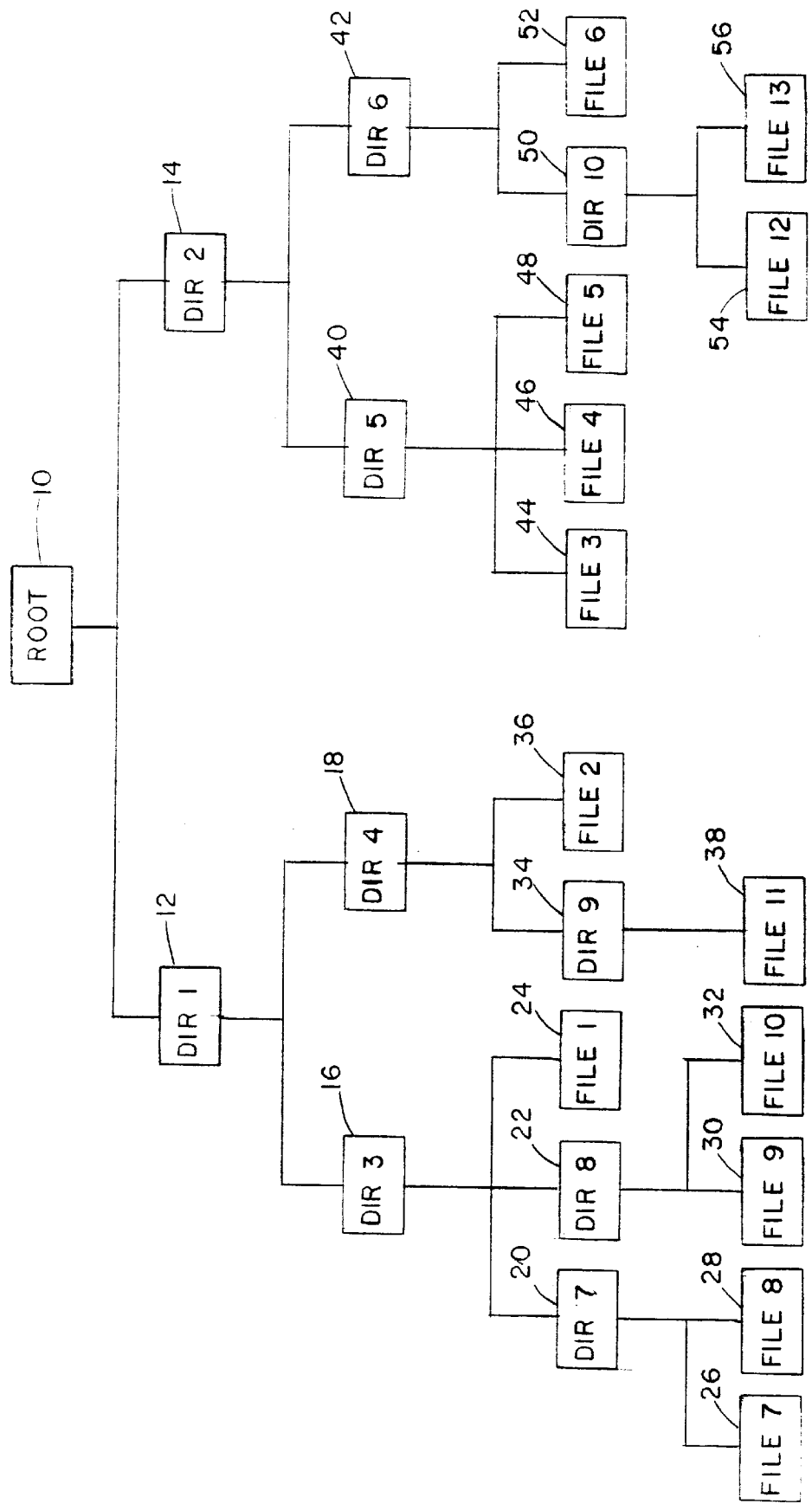
FIG. 1 is a diagram showing an exemplary hierarchical (i.e., tree) file structure for use in describing the background of the present invention, and the improved prefix caching method of the present invention.

Before discussing a particular application of caching in a data processing system using the pigeon hole principle, the pigeon hole principle itself and its general application to caching in a data processing system is discussed. The pigeon hole principle and its generalization, the Ramsay theorem, are widely used in the field of discrete mathematics. Simply stated, in a system having K pigeon holes with (K+1) pigeons placed therein, the pigeon hole principle states that there exists a pigeon hole with at least two pigeons placed therein. Other, more formal definitions of the pigeon-hole principle, are set forth in the literature for discrete mathematics.

Before applying the pigeon-hole principle to caching in a data processing system (e.g., a computer), some definitions are needed. Assume that the system has a directed graph $G=(V, E)$ of "access patterns" (i.e., E being a subset of the Cartesian product $E*E$ of access patterns). Vertices set V represents "cache items", and an edge of vertices $(v_1 \rightarrow v_2)$ represents an "access pattern". Further assume that there is a set S of "start vertices". Then, an access pattern to a particular cache item v can be represented by a path of vertices $(v_1 \rightarrow, \ldots, \rightarrow v_n)$, wherein vertex $v_1$ is one of the start vertices in set S and vertex $v_n$ is at the end of the path (i.e., $v_n=v$). In other words, vertex $v_n$ can be accessed by starting at start vertex $v_1$, accessing $v_2$ from $v_1$, accessing $v_3$ from $v_2$, and so on, until vertex $v_n$ is reached. A "prefix" of an access pattern $(v_1 \rightarrow, \ldots, \rightarrow v_n)$ is any sub-path of the access pattern $(v_1 \rightarrow, \ldots, \rightarrow v_n)$. For example, if an access pattern for vertex $v_5$ is $(v_1, v_2, v_3, v_4, v_5)$, possible prefixes for this access pattern are: $(v_1)$; $(v_1, v_2)$; $(v_1, v_2, v_3)$; $(v_1, v_2, v_3, v_4)$; and $(v_1, v_2, v_3, v_4, v_5)$.

A "level" can be defined as a set of vertices L such that the intersection of S and L is the empty set, L is an independent set in G (i.e., no path connects the elements of L), and each vertex v in L has at least one access pattern reaching v. A "simple access pattern" is an access pattern that does not traverse itself. The "accessibility degree" of a vertex v is the number of simple access patterns that reach vertex v. The "size" of a level L is defined as the size of the set L. For the remainder of this discussion, only simple access patterns are assumed. A level L is accessed by an access pattern if the access pattern is traversed until a vertex in L is hit.

With these definitions, the following two observations are the direct result of applying the pigeon-hole principle to this data processing system:

1. Given a level L, if L is accessed ($|L|+1$) times, there is at least one vertex v in L that was accessed twice; and
2. Given a level $\{v_1 \rightarrow, \ldots, \rightarrow v_k\}$ for which the accessibility degree of $v_i$ is $a_i$, if L is accessed ($a_1 + \ldots + a_k + 1$) times, there is at least one access pattern which was used twice.

Based on these observations, the following procedure decreases the length of the path of vertices in an access pattern needed to reach a given vertex v. For a given graph of access patterns G, and for a given level L in G, assume that a map has been defined in the system between an access pattern $(v_1 \rightarrow, \ldots, \rightarrow v_k)$ and vertex $v_k$, wherein $v_1$ is one of the starting vertices in set S and $v_k$ is a vertex reached in L by the access pattern. Also assume that a domain-specific "access pattern resolution primitive" has been defined, and is called "lookup()". Lookup() accepts an access pattern as an input, and outputs the last vertex of the access pattern. Then, for a given access pattern $(v_1 \rightarrow, \ldots, \rightarrow v_n)$, the system uses the above-described map to determine if there is a prefix of $(v_1 \rightarrow, \ldots, \rightarrow v_n)$ that reaches L. If the access pattern reached L (i.e., if $v_k$ is in L and the access pattern is $(v_1 \rightarrow, \ldots, \rightarrow v_k \rightarrow, \ldots, \rightarrow v_n)$, the system calls lookup($v_k \rightarrow, \ldots, \rightarrow v_n$). Otherwise, if the access pattern did not reach L, the system calls lookup($v_1 \rightarrow, \ldots, \rightarrow v_n$). Thus, if a prefix of the access pattern reaches L, the number of vertices in the path that must be resolved by lookup() is n−k. However, if the prefix does not reach L, the number of vertices that must be resolved is n−1. Therefore, this procedure decreases the number of vertices to be resolved by the value k−1.

The application of prefix caching for namespace resolution in a data processing system using the pigeon hole principle is now described. In a hierarchical file structure having a root directory (and disregarding symbolic links, hard links and mount points), the namespace can be regarded as a tree. In the namespace, directories and files can be regarded as vertices v. There will be an edge between two vertices $v_1$ and $v_2$ if $v_1$ is a directory and $v_2$ is either a sub-directory of $v_1$, or a file stored in $v_1$. The kth level of the namespace includes all of the files and sub-directories located at a distance k from the root directory. Thus, the kth level of the namespace is a "level" as defined above. The access pattern for a given file will depend on a path that starts at the root directory and passes through various sub-directories until it reaches the given file. Based on the manner in which namespace resolution is implemented under the logical file system (LFS) of the OS/400 operating system, under UNIX in general, and probably under other existing systems such as WINDOWS/NT, the cost of namespace resolution for the file can thus be modeled by the access pattern length. If the pigeon hole principle is applied to the namespace's kth level, there will be a guaranteed repeated access of at least one simple access pattern for each node in the namespace. Thus, if every namespace resolution up to the kth level is cached, the first cache hit will occur after at most $(|L|+1)$ accesses.

For example, if the beginning of the namespace is a full binary tree as in FIG. 1, the first level (i.e., k=1) will have two directories (i.e., DIR1 and DIR2) and two access patterns. If every namespace resolution up to the $1^{st}$ level is cached, it is guaranteed that at least one pathname will be used twice in every three namespace resolutions of absolute pathnames with more than one component in the pathname. Similarly, the second level (i.e., k=2) will have four directories (i.e., DIR3–DIR6) and four access patterns. If every namespace resolution up to the $2^{nd}$ level is cached, it is guaranteed that at least one pathname will be used twice in every five namespace resolutions of absolute pathnames with more than two components in the pathname. The kth level that is cached may depend on the size of the cache. This result of the pigeon hole principle as applied to namespace resolution is used to improve the performance of a data processing system as explained below.

Figure 2:
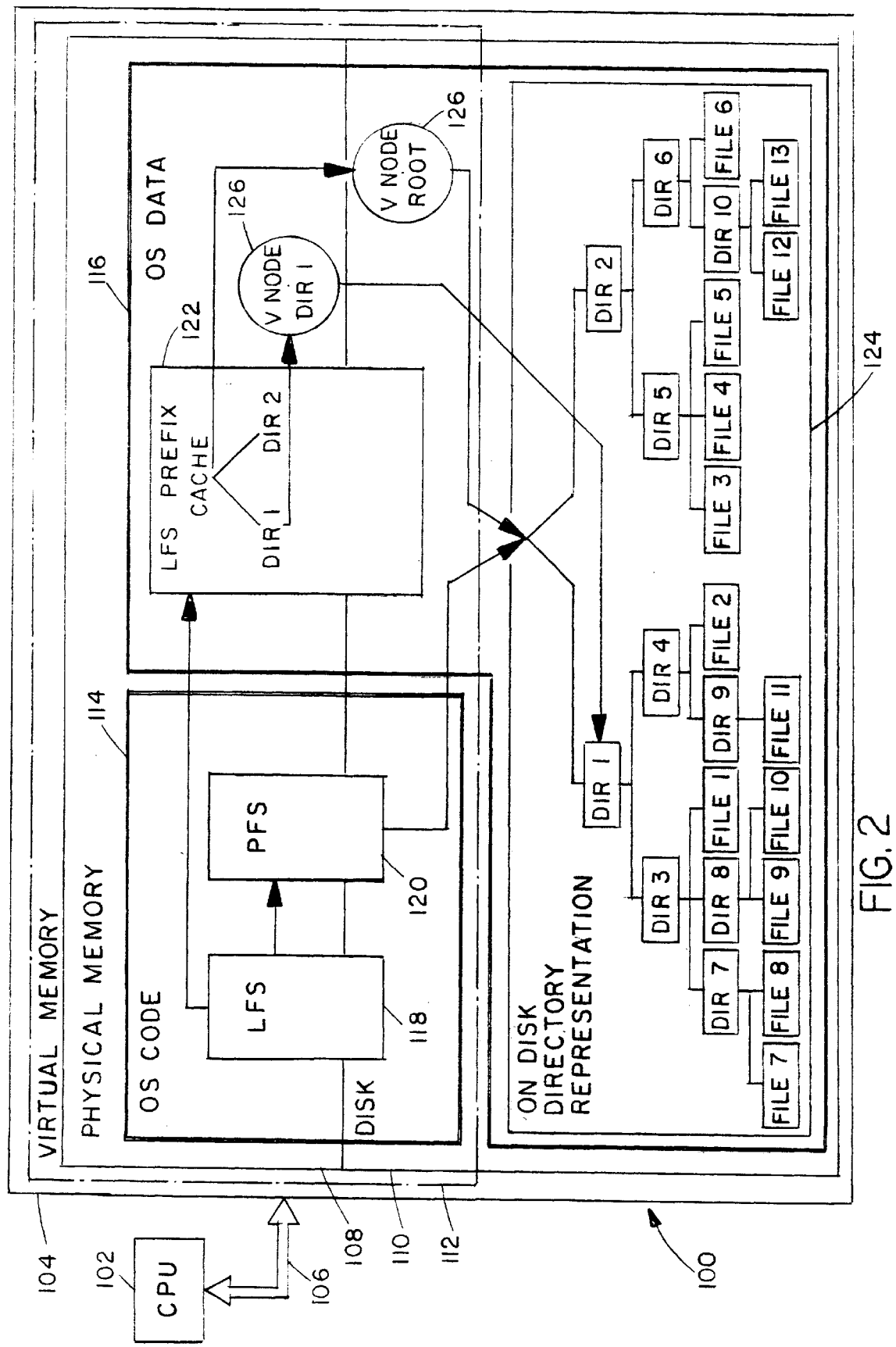
FIG. 2 is a block diagram of a data processing system having a hierarchical file structure (such as the exemplary structure shown in FIG. 1) which uses prefix caching to resolve hierarchical file pathnames into representations of the files named by the paths (i.e., namespace resolution) in accordance with an embodiment of the present invention.

Referring to FIG. 2, the logical structure of a data processing system 100 (e.g., a computer) having a hierarchical file structure such as that in FIG. 1 is shown. System 100 includes a central processing unit (CPU) 102 in communication with a memory hierarchy 104 over a bus 106. Memory hierarchy 104 includes both real and virtual memory. The real memory includes physical memory 108 (e.g., RAM, ROM) and a disk 110 (e.g., optical or magnetic disk) mounted on an appropriate disk drive (not shown) accessible to CPU 102. The virtual memory, represented by a dashed box 112 in FIG. 2, includes both physical memory 108 and a portion of disk 110. The operating system (OS) includes a code section 114 and a data section 116, portions of which reside in both physical memory 108 and disk 110. OS code section 114 includes a logical file system (LFS) 118 and at least one physical file system (PFS) 120. OS data section 116 includes a LFS prefix cache 122 and an on-disk directory representation 124 of the hierarchical file structure. Directory representation 124 illustrates the exemplary file structure of FIG. 1. LFS 118, PFS 120 and prefix cache 122 are stored in virtual memory 112, while directory representation 124 is physically stored on disk 110.

In one embodiment, the operating system is the OS/400 operating system running on AS/400 hardware, available from IBM, using both RISC and IMPI processors. Alternatively, other operating systems may be used which employ hierarchical file systems using an object-based abstraction during pathname resolution. These other operating systems include all UNIX-based systems, Windows/NT, etc. Suitable hardware platforms for running these operating systems are well known to people of ordinary skill in the art.

LFS 118 is a portion of the OS/400 file system that operates between the system call and vnode interface levels, and that deals with all files uniformly (i.e., independently of the on-disk representation of the file or directory). For example, LFS 118 deals with all files uniformly regardless of whether the files are local or remote, or whether the disk on which the file is stored is an optical (e.g., CD-ROM) or magnetic disk. The file system is able to treat all files uniformly by using an in-memory, object-based abstraction of the file, referred to as the file's vnode or incore representation. When a pointer to a vnode is available, the LFS can uniformly apply different operations (i.e., "vnode operations") to the file represented by the vnode.

PFS 120 implements the operation on the vnode as requested by LFS 118. The PFS provides the implementation of a file or directory, and encapsulates knowledge of the file or directory's representation on disk. For example, a PFS service can be called to read the content of a directory or file from disk 110. Different types of PFS support different types of hardware (e.g., optical or magnetic disks). In the OS/400 operating system, LFS 118 can utilize a set of possible operations on a given file's vnode (e.g., reading the contents of the file). Each PFS provides its own implementation of this set of operations which depends on the type of hardware. For example, a different PFS is used to read the content of a file stored on an optical disk than is used to read the content of a file stored on a magnetic disk. Thus, LFS 118 can simply call the appropriate PFS 120 service to deal with all files and directories independently of the underlying hardware, and the PFS accesses on-disk directory representation 124 to implement the operation.

Prefix cache 122 contains a representation of an upper-level portion of the namespace maintained by PFS 120 on disk 110. This portion includes a subset of all pathnames that begin at the root directory and have a limited length. In the example of FIG. 2, only namespace resolutions up to the $1^{st}$ level have been cached (e.g., the root directory, DIR1 and DIR2 form the subset of all pathnames that have been cached). Alternatively, namespace resolutions up to the kth level could have been cached, subject to the size of the cache. The limited cache size limits the length of pathnames that can be cached, such that only the portion of the namespace close to the root directory (i.e., the top of the namespace) is typically cached. The cache includes not only the subset of pathnames, but also a reference to the vnode 126 for the file or directory named by the pathnames (i.e., vnode of DIR1 and DIR2). As explained below, LFS 118 uses prefix cache 122 during namespace resolution to translate a prefix of a pathname into its vnode representation.

Before discussing the method of using prefix cache 122 during namespace resolution, it is useful to examine how namespace resolution would be performed in the absence of the prefix cache. To resolve the pathname for a given file, LFS 118 would invoke PFS 120 to resolve each component of the pathname, and PFS 120 would generally be required to search directory representation 124 stored on disk 110 for each component. As discussed above, the need to repeatedly search disk 110 will adversely effect the performance of data processing system 100. Further, even if PFS 120 were to cache data such that it may not need to read from disk 110 each time, performance will also be adversely effected whenever LFS 118 is required to interact with PFS 120. As described below, both of these adverse effects can be minimized using prefix cache 122 to resolve one or more of the higher-level components of the pathname since only the lower-level pathname components will still need to be resolved by PFS 120.

To fully resolve a pathname, LFS 118 will first search prefix cache 122 to determine if a prefix of the pathname has been cached (i.e., to determine whether translation of a prefix of the pathname has succeeded). If not, LFS 118 will cause PFS 120 to access the on-disk directory representation 124 just as if prefix cache 122 were not present (i.e., by using the entire pathname for the given file, including its upper-level prefix components and lower-level components, as an input to the access pattern resolution primitive). Thus, there will be no improvement in performance, though LFS 118 may add the pathname to prefix cache 122. However, if a prefix of the pathname was found in prefix cache 122, the prefix cache lookup will return the vnode for the entire prefix as its result. Since the entire prefix will already have been resolved by reference to prefix cache 122, LFS 118 will not need to cause PFS 120 to access disk 110 to resolve any of the upper-level pathname components in the prefix. This will save the costs of accessing disk 110 for these components, and will also save the costs of having LFS 118 interact with PFS 120. In this case, PFS 120 need only access disk 110 to resolve lower-level pathname components following the cached prefix. This savings can be illustrated by example. Assume the pathname to be resolved is "/DIR1/DIR3/DIR8/FILE10". The prefix "/DIR1" will be found in prefix cache 122, and the prefix cache lookup will return the prefix's vnode 126 without the need for LFS 118 to interact with PFS 120, and without the need for PFS 120 to access disk 110. To complete the resolution of the full pathname, LFS 118 will only need to cause PFS 120 to access disk 110 to resolve the lower-level pathname components "DIR3/DIR8/FILE10". Thus, fewer disk accesses and fewer interactions with PFS 120 are required due to the prefix caching.

Figure 3A:
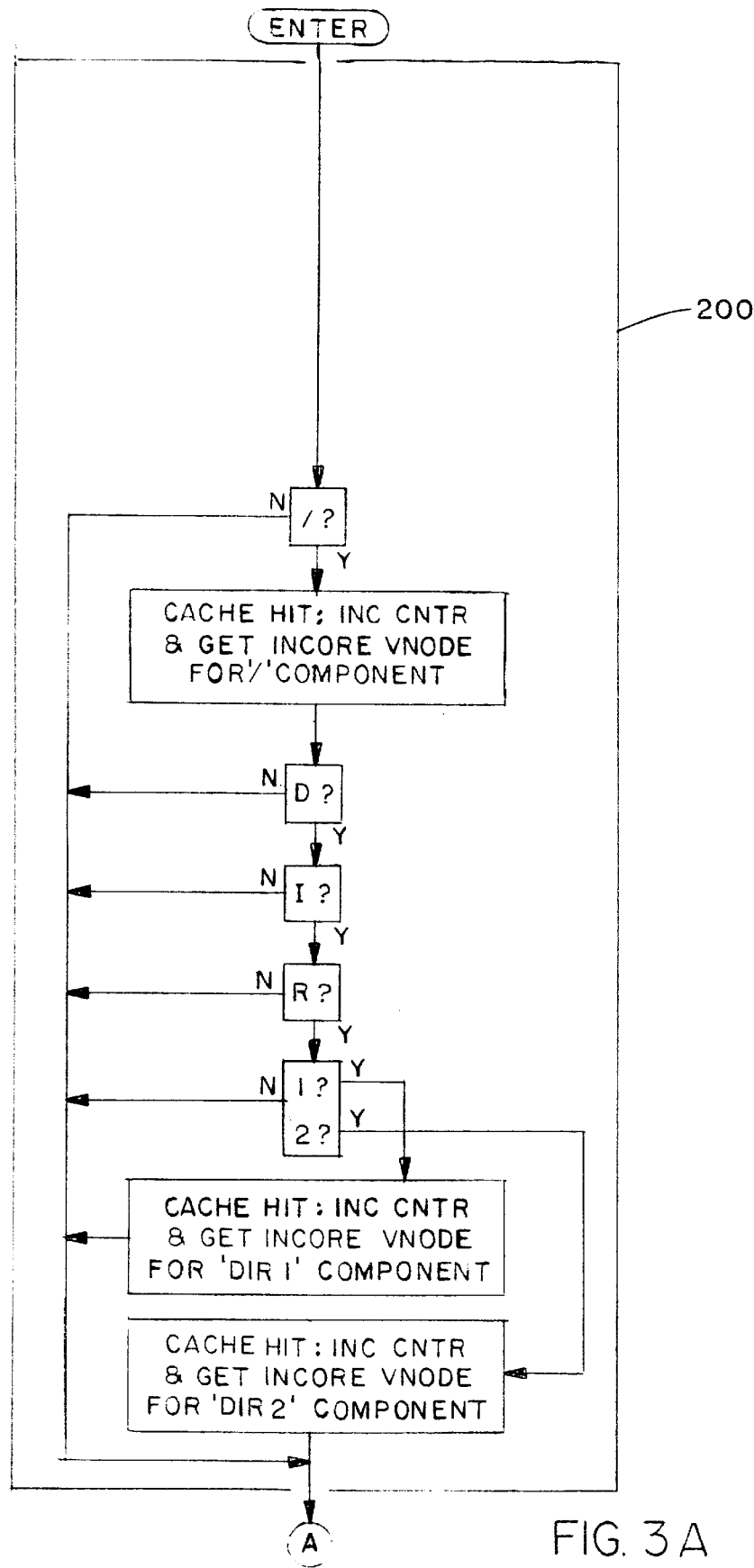
FIGS. 3A and 3B are flow charts representing the method by which the data processing system shown in FIG. 2 uses prefix caching for namespace resolution of the specified pathname for a given accessed file.
Figure 3B:
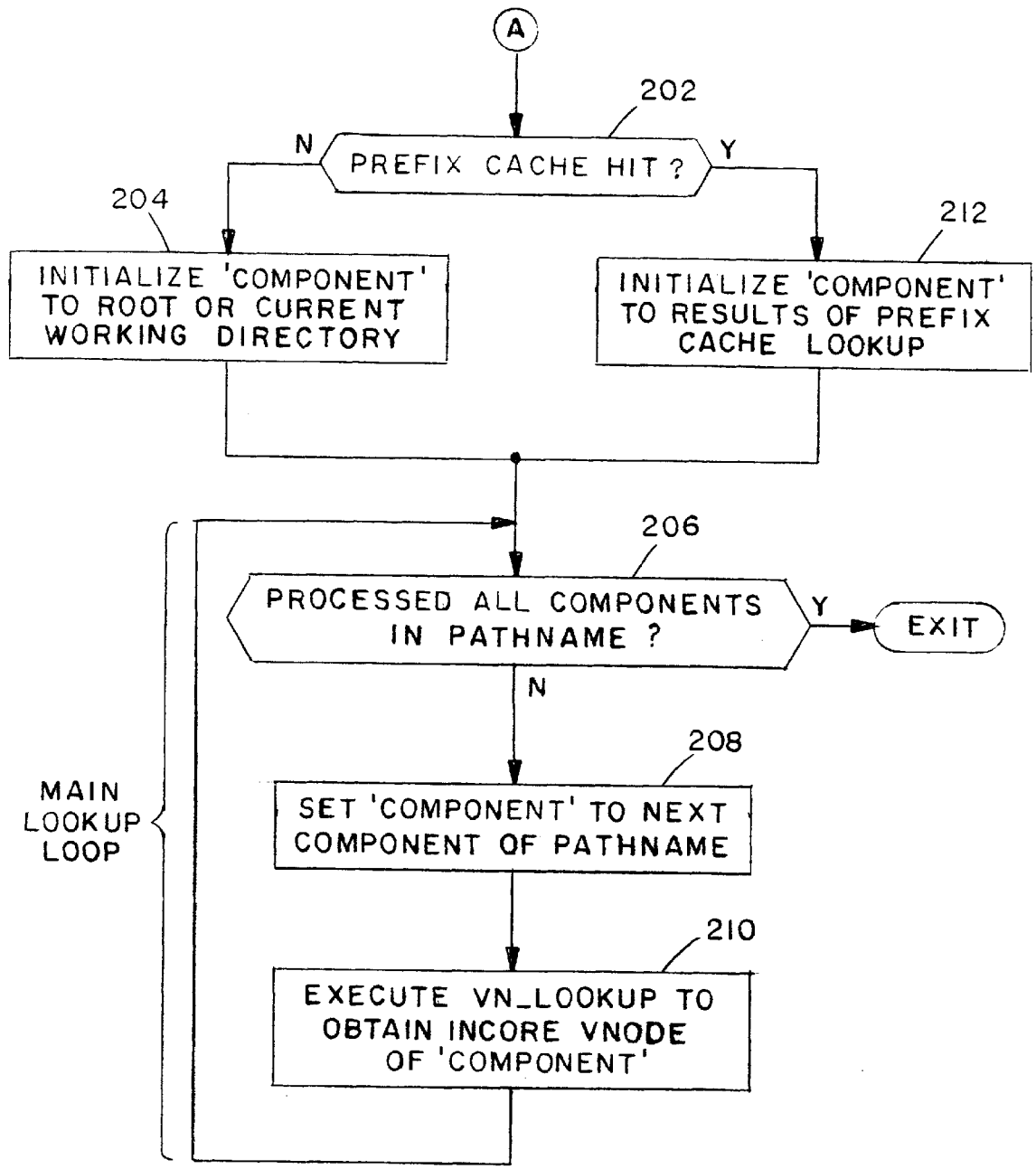

Referring to FIGS. 3A and 3B, the method by which data processing system 100 uses prefix cache 122 for namespace resolution of a particular pathname is shown in further detail. At step 200, data processing system 100 determines whether prefix cache 122 includes a prefix of the pathname. In this example, it is again assumed that system 100 uses the exemplary file structure of FIG. 1, and that only the $1^{st}$ level of the namespace has been cached. Each character of the first pathname component is first checked to determine if the first component is the root directory (i.e., "/"). If the first character of the pathname/filename is not a "/", no prefix of the pathname has been cached. However, if the first character of the pathname/filename is a "/", a counter is incremented to track the frequency of reaching this pathname component, and the vnode (i.e., incore representation) of the root directory is retrieved. Then, each character of the second pathname component is checked to determine if the second component is a sub-directory on the first cached level of the namespace (i.e., "DIR1" or "DIR2"). If not, only the "/" prefix was cached and only the vnode of the root directory is output from prefix cache 122. However, if the second component was "DIR1" (or "DIR2"), a counter is incremented to trace the frequency of reaching this pathname component, and the vnode of the "DIR1" (or "DIR2") component is retrieved from prefix cache 122, and is used as explained below. Similar steps to those shown would be used to determine if the pathname included a prefix having additional components up to the kth level, if the kth level of the namespace was cached.

At step 202, system 100 determines if a prefix cache hit occurred at step 200. If not, at step 204, the next component of the pathname which is to be resolved ('COMPONENT') is initialized to the root directory (for absolute pathnames) or the CWD (for relative pathnames) before the main namespace resolution loop, including steps 206–210, is executed. At step 206, the main loop continues processing until all pathname components have been resolved. At step 208, 'COMPONENT' is set to the next component of the pathname. At step 210, the access pattern resolution primitive "vn_lookup()" is invoked to obtain the vnode of 'COMPONENT'. This process continues until the pathname is fully resolved. Thus, if no cache hit occurs, the main loop operates just as if there was no prefix cache 122.

However, if it was determined at step 202 that a cache hit did occur, the next component of the pathname to be resolved ('COMPONENT') is initialized at step 212 to the results of the prefix cache lookup (i.e., the vnode of the cached prefix) before the main loop is executed. Thus, the main loop only needs to resolve the lower-level pathname components which occur after the cached prefix. For example, assume that the pathname being resolved is "/DIR1/DIR3/DIR8/FILE10". In this case, a cache hit would have been found at step 200 for the prefix "/DIR1", and 'COMPONENT' would have been initialized at step 212 to the results of the prefix cache lookup (i.e., the vnode of "/DIR1"). Then, the first iteration of the main loop would have obtained the vnode of "/DIR1/DIR3", the second iteration would have obtained the vnode of "/DIR1/DIR3/DIR8", and the third iteration would have obtained the vnode of "/DIR1/DIR3/DIR8/FILE10", which fully resolves the pathname. Thus, only three iterations of the main loop, and only three accesses of disk 10, are required to fully resolve the pathname. In contrast, without prefix cache 122, an additional iteration of the main loop (to find the vnode for "/DIR1"), and an additional disk access, would have been required to fully resolve the pathname. Once the vnode for the accessed file is obtained, the desired operation may then be performed by LFS 118. For example, LFS 118 may later operate on the vnode to find the contents of the file, but this occurs only after the namespace resolution process is complete.

In the above example, one iteration of the main loop, and one disk access, was saved by reference to prefix cache 122. This savings may not be as great as in a caching system wherein the vnode of an entire pathname is cached, provided that a cache hit occurs. However, as stated before, it is difficult to predict which pathnames should be cached in a file system because the usage profile is not known and is unpredictable. Although the savings per prefix cache hit in the present invention may not be as great as the savings per cache hit in a system which caches the entire pathname, the overall system performance will be increased as most or all file accesses result in a prefix cache hit since the top portion of the namespace is cached.

In addition, the above example assumed that only the $1^{st}$ level of the namespace was cached. The savings associated with prefix caching will increase as more levels of the namespace are cached. For example, if the prefix cache included the $2^{nd}$ level of the namespace (e.g., DIR3–DIR6), only two iterations of the main loop, and only two disk accesses, would be needed to fully resolve the absolute pathname for FILE10, rather than the four needed without prefix caching. The potential savings will increase with the number of levels cached, subject to the size limitations of the cache.

Prefix cache 122 can be tuned using parameters that implicitly effect the portion of the hierarchical namespace entered into the cache. These parameters include the number of pathname components and the number of characters to be inserted into the cache. Increasing the number of components and characters in the cache will increase the portion of the namespace entered into the cache, thereby increasing system performance. Ideally, both of these parameters could be increased together. However, the practical limits on the size of the cache mean that an increase in one of these parameters will require a corresponding decrease in the other parameter. The preferred values of these parameters will depend upon the use of the namespace in a particular application. If the namespace is "broad" at the top (i.e., a relatively large number of entries in the higher-level directories), optimal performance may be achieved by storing a small number of pathname components but a large number of characters in the cache. Conversely, if the namespace is "narrow" at the top (i.e., a relatively small number of entries in the higher-level directories), optimal performance may be achieved by storing a small number of characters but a large number of pathname components in the cache. Optimization of these tuning parameters can be achieved empirically by the system operator.

In situations where traditional caching techniques cannot be implemented or are inefficient due to large variances between systems in the structure of the cache items or large variances in the way a particular system uses the cache items over time but where the structure of the cache items for a given system is stable, the application of the pigeon hole principle as described above can result in performance improvements. The prefix cache method described above can be modified using statistical heuristics to dynamically update or "grow" that portion of the namespace in the cache which is frequently used. As described above, the prefix caching process uses counters to track the frequency at which particular components in the prefix cache are accessed. Once a particular component has been accessed more than a threshold number of times, new pathnames that contain this component may be added to the cache under the assumption that the new pathnames will also be accessed frequently. The threshold number can be set as a configuration parameter. Note that pathnames will be added up to a configurable length, memory limits permitting, since these pathnames will almost always be frequently used since they are near the top of the directory hierarchy.

It may also be possible to remove pathnames from the cache when the cache is full if they are not frequently accessed. Any removal must occur slowly since the prefix caching method described herein is optimized towards the steady state. Pathnames could be removed, for example, by placing the cache in a removal mode when the cache is full and, the next time a prefix in the cache is accessed that is rarely used, piggy-backing the lookup of the prefix with the removal of the prefix. Another way to remove pathnames would be to use a variant of the clock algorithm used in virtual memory management schemes to simulate a least recently used policy.

Caching using the pigeon hole principle can also be used in other applications of data processing systems. For example, this type of caching can be applied to a distributed namespace by viewing PFS 120 as a representation of a portion of a namespace on another system. The graph is still a namespace, and is now a distributed namespace. For another example, this type of caching can also be applied to relational database applications. Assume that a relational database application for a business includes a department table and an employee table, with each employee belonging to a department. To access an employee, one must first access the department table and then the employee table. The department table is analogous to the directories described herein, and the employee table is analogous to the files. For yet another example, this type of caching can also apply to compiler code arrangement. When compiling code, it can be advantageous to organize code such that all code at a higher level will be on the same page, thereby reducing page faults under some scenarios. In this context, the vertices are the basic blocks of the program, and there is an edge from a basic block A to a basic block B if there is an execution of the program that first executes A and then B.

It will be evident that there are additional embodiments and applications which are not disclosed in the detailed description but which clearly fall within the scope and spirit of the present invention. For example, the features described above in relation to each embodiment may be combined with the features of the other embodiments. The specification is, therefore, not intended to be limiting, and the scope of the invention is to be limited only by the following claims.

We claim:

1. In a computer including a hierarchical file structure having a namespace including a pathname associated with each of a plurality of files, the pathname for each file including at least one prefix component and at least one lower-level component, an apparatus for resolving hierarchical file pathnames into representations of the files named by the paths, comprising:

a memory storing a prefix cache for the hierarchical file structure which includes a representation of an upper-level portion of the namespace for the file structure, the upper-level portion of the namespace including the at least one prefix component of the pathname for each of the files;

means for translating the at least one prefix pathname component for the given file into the representation of the upper-level portion of the namespace for the given file by searching the prefix cache for the at least one prefix pathname component; and means for completing resolution of the pathname for the given file when the translation succeeds by using the at least one lower-level pathname component for the given file as an input to an access pattern resolution primitive which outputs a representation of the given file.

2. The apparatus of claim 1 further comprising means for resolving the pathname for the given file when the translation does not succeed by using the entire pathname of the given file, including its prefix and lower-level components, as an input to the access pattern resolution primitive which outputs the representation of the given file.

3. The apparatus of claim 2 further comprising means for counting each time a prefix pathname component stored in the prefix cache is reached.

4. The apparatus of claim 3 further comprising means for adding new pathnames to the prefix cache that contain the particular pathname component when the respective counter for a particular prefix pathname component reaches a predetermined threshold.

5. A method for resolving access patterns in a data processing system having a directed graph G of access patterns, directed graph G including a vertices set V representing a plurality of cache items, each cache item v having at least one access pattern defined by a path of vertices $(v_1 \rightarrow, \ldots, \rightarrow v_n)$, vertex $v_1$ being a start vertex representing the start of the path and vertex $v_n$ being an end vertex representing the end of the path, wherein end vertex $v_n$ is equal to the cache item v, the method comprising the steps of:

defining a prefix cache for directed graph G, the prefix cache containing a map between an access pattern $(v_1 \rightarrow, \ldots, \rightarrow v_k)$ and vertex $v_k$ for a kth level L in graph G, wherein vertex $v_k$ is a vertex in the kth level L in graph G which is reached by the access pattern $(v_1 \rightarrow, \ldots, \rightarrow v_k)$ and L is an independent set of vertices in G which does not include any start vertices;

storing the prefix cache in a memory; and for a given access pattern $(v_1 \rightarrow, \ldots, \rightarrow v_n)$, searching the stored prefix cache for a prefix $(v_1 \rightarrow, \ldots, \rightarrow v_k)$ of the given access pattern that reaches the kth level L and, if the search is successful, outputting vertex $v_k$ by reference to the stored prefix cache and calling an access pattern resolution primitive which accepts access pattern $(v_k>, \ldots \rightarrow v_n)$ as an input and generates vertex $v_n$ as an output to fully resolve the given access pattern.

6. The method of claim 5 wherein, if the search was not successful, the method comprises setting the input to the access pattern resolution primitive to the given access pattern $(v_1 \rightarrow, \ldots \rightarrow v_n)$ to generate vertex $v_n$ as the output, wherein the given access pattern $(v_1 \rightarrow, \ldots, \rightarrow v_n)$ is fully resolved.

7. A method for namespace resolution of a given file in a data processing system having a hierarchical file structure, the file structure having a namespace including a pathname associated with each of a plurality of files, the pathname for each file including at least one prefix component and at least one lower-level component, the method comprising the steps of:

defining a prefix cache for the hierarchical file structure, the prefix cache including a representation of an upper-level portion of the namespace for the file structure, the upper-level portion of the namespace including the at least one prefix component of the pathname for each of the files;

storing the prefix cache in a memory;

translating the at least one prefix pathname component for the given file into the representation of the upper-level portion of the namespace for the given file by searching the prefix cache for the at least one prefix pathname component; and when the translation succeeds, completing resolution of the pathname for the given file by using the at least one lower-level pathname component for the given file as an input to an access pattern resolution primitive which outputs a representation of the given file named by the pathname.

8. The method of claim 7 wherein, when the translation does not succeed, the method comprises resolving the pathname for the given file by using the entire pathname of the given file, including its prefix and lower-level components, as an input to the access pattern resolution primitive which outputs the representation of the given file named by the pathname.

9. The method of claim 8 wherein the prefix cache stores a subset of pathnames that start at a root directory and have a limited length such that the upper-level portion of the namespace starts at the root directory.

10. The method of claim 9 wherein the prefix cache further stores a representation of the file or directory named by each pathname in the subset of pathnames which is stored in the prefix cache.

11. The method of claim 10 wherein the representation of each file or directory stored in the prefix cache is its in-core representation (i.e., vnode).

12. The method of claim 11 wherein the translation of the at least one prefix pathname component for the given file generates the vnode of the file or directory named by the at least one prefix pathname component.

13. The method of claim 12 further comprising the step of tuning the prefix cache by adjusting the number of pathname components stored therein.

14. The method of claim 13 wherein the tuning step includes adjusting the number of characters stored at each level of the prefix cache.

15. The method of claim 8 wherein the translation starts at a root directory of the namespace and the pathname is absolute.

16. The method of claim 8 wherein the translation starts at a current working directory in the namespace and the pathname is relative.

17. The method of claim 8 wherein, when the translation succeeds, at least a portion of the pathname is resolved without accessing an on-disk representation of the pathname.

18. The method of claim 8 further comprising the step of updating a respective counter each time a prefix pathname component stored in the prefix cache is reached.

19. The method of claim 18 wherein, when the respective counter for a particular prefix pathname component reaches a predetermined threshold, the method further comprises the step of adding new pathnames to the prefix cache that contain the particular pathname component.

20. The method of claim 8 wherein a portion of the namespace resides on a remote data processing system such that the namespace is a distributed namespace.

* * * * *